United States Patent [19]

Lee

[11] 4,188,005

[45] Feb. 12, 1980

[54] BAG SUPPORT FRAME

[76] Inventor: Chun C. Lee, 10285 Gentlewind Dr., Cincinnati, Ohio 45242

[21] Appl. No.: 963,528

[22] Filed: Dec. 20, 1978

[51] Int. Cl.² .................... A63B 55/04; F16M 11/00
[52] U.S. Cl. ................................... 248/97; 220/401; 220/404; 248/161
[58] Field of Search .............. 248/97, 99, 101, 95, 248/161; 150/1; 220/401, 404

[56] References Cited

U.S. PATENT DOCUMENTS

| | | | |
|---|---|---|---|
| 651,773 | 6/1900 | Smith | 248/97 |
| 1,113,287 | 10/1914 | Barnes | 248/97 |
| 1,276,453 | 8/1918 | Tussing | 248/97 X |
| 2,149,042 | 2/1939 | Branthover | 248/97 |
| 2,500,466 | 3/1950 | Myers | 220/404 X |
| 2,639,110 | 5/1953 | Nicolas | 248/97 X |
| 2,731,950 | 1/1956 | Davidson | 248/95 X |
| 3,235,215 | 2/1966 | Lodde, Jr. | 248/161 |
| 3,771,752 | 11/1973 | Meech | 248/101 X |
| 3,977,450 | 8/1976 | Schanpier | 150/1 |

FOREIGN PATENT DOCUMENTS 243455 8/1960 Australia .................... 248/97

Primary Examiner—James T. McCall
Attorney, Agent, or Firm—Wood, Herron & Evans

[57] ABSTRACT

A bag support frame that comprises a collapsible and adjustable multi-leg stand, and an adjustable bag mouth frame connected to the stand. The stand is vertically adjustable relative to ground level to support the bag by resting it on the ground at all times, and is designed to support the bag mouth frame in a generally horizontal plane above ground level. The bag mouth frame is vertically adjustable relative to the hook connected to the top of the stand to fit the size of a lawn mower's grass bag or the like, and is also horizontally adjustable for varying the frame's mouth size as desired to fit the mouth size of the bag resting on the ground.

2 Claims, 5 Drawing Figures

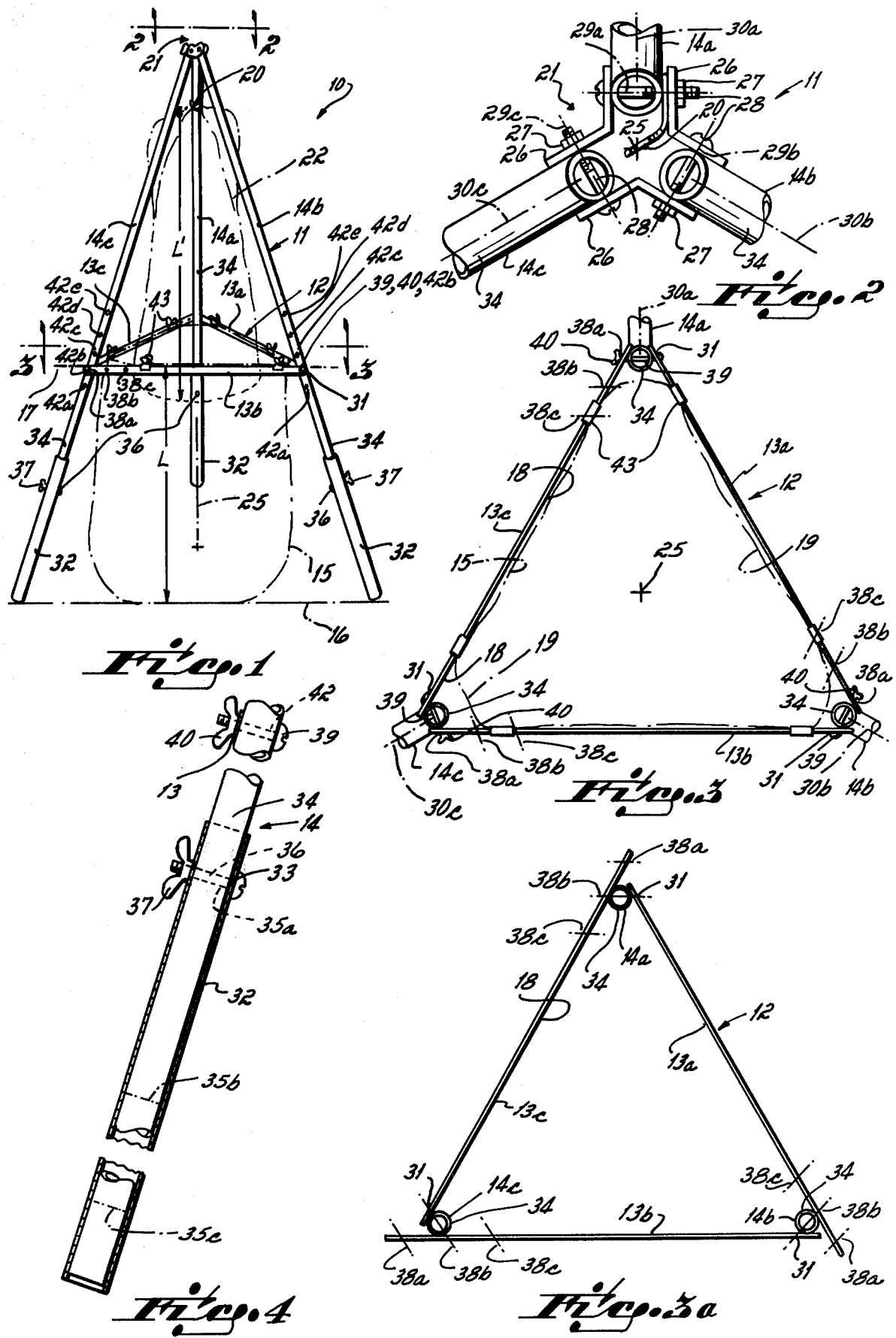

BAG SUPPORT FRAME

This invention relates to bag frames. More particularly, this invention relates to a bag support frame which is vertically adjustable to support two different length bags simultaneously, and is horizontally adjustable to fit various mouth sizes of bags.

Bag support frames are, of course, very well known to the prior art. The primary function of a bag support frame is to support a flexible or collapsible bag in a fully open or receiving position. Such bag support frames known to the prior art have been used typically in connection with laundry bags and garbage bags. However, these frames are only capable of supporting a single size bag at a time, and are not horizontally adjustable to fit various mouth sizes of bags. In connection with garbage bags, today they are often fabricated of sheet polyethylene, and are sized to package grass clippings or leaves or the like or other trash collected around the yard. But these garbage bags come in different sizes depending on the manufacturing source.

Accordingly, it is the primary objective of this invention to provide a novel bag support frame which includes a vertically adjustable, collapsible multi-leg stand and a bag mouth frame, i.e., the frame to which the lip of a bag is fixed, which is adjustable both vertically and horizontally. The vertical adjustment of the stand legs is to permit the bag to rest on the ground at all times depending on the length of the bag. The horizontal adjustment of the bag mouth frame is to permit the bag mouth frame's mouth size to be adjusted depending on the mouth size of the bag and the vertical adjustment of the bag mouth frame serves to accommodate the length of the secondary bag hooked to the top of the stand, and to accommodate the length of the primary bag resting on the ground, depending on the convenience of the user. The hook which is connected to the top of the multi-leg stand allows, for example, a lawn mower's grass bag or the like, i.e., the secondary bag, to be hung in inverted fashion therefrom while that grass bag is being emptied into the garbage bag, i.e., the primary bag, supported by the bag mouth frame. The bag mouth frame is vertically adjustable relative to the hook so that the grass bag's outlet end can be positioned in juxtaposition with the garbage bag's mouth when emptying the grass bag into the garbage bag.

Other objectives and advantages of this invention will be more apparent from the following detailed description taken in conjunction with the drawings in which:

FIG. 1 is a perspective view illustrating a bag support frame in accord with the principles of this invention;

FIG. 2 is a cross sectional view taken along line 2—2 of FIG. 1;

FIG. 3 is a cross sectional view taken along line 3—3 of FIG. 1;

FIG. 3a is a view similar to FIG. 3, but showing a different mouth size for the bag mouth frame; and FIG. 4 is an enlarged view of a portion of one of the frame's legs.

The bag support frame 10 of this invention, as illustrated in FIG. 1, is comprised of a collapsible tri-leg stand 11. A bag mouth frame 12, comprised of three rods 13a–13c, is connected to the stand's three legs 14a–14c. The bag mouth frame 12, i.e., the bag mouth rods 13, are vertically adjustable on the stand's legs 14, and the stand's legs are themselves also vertically adjustable, so as to allow positioning of the bag mouth frame 12 at a vertical position dependent on the length L of primary bag 15, thereby permitting the bag to rest on ground 16 at all times if desired. The bag mouth frame 12 is also adjustable in a horizontal plane 17 so as to adjust that frame's mouth 18 size depending on the mouth 19 size of the bag 15 being used with the frame. A hook 20 is connected to the top 21 of the tri-leg stand 11. The hook 20 allows a secondary bag 22, e.g., a lawn mower's grass bag or the like, to be hung in inverted fashion therefrom while that bag 22 is emptied into the primary bag 15 supported by the bag mouth frame 12. Because of the vertical adjustability of the bag mouth frame 12 along the length of the three legs 14, and since lawn mower grass bags 22 have different lengths L', the vertical position of that frame 12 can be positioned as desired relative to the hook 20, thereby adjusting the vertical position of the bag mouth frame relative to the hook as well as relative to ground 15.

More particularly, the stand 11 is comprised of three legs 14a–14c pivotally connected together at the top end 21, the three legs when erected defining vertical center axis 25 for the stand. Three angle brackets 26 cooperate with the top ends of the three legs 14, as shown in FIG. 2, nuts 27 and bolts 28 being provided to connect the top ends of the legs with the respective brackets so as to connect the three legs together on respective pivot axes 29a–29c. This bracket 26/leg 14 connector structure permits the legs 14 to be collapsed into generally parallel storage relation when the bag mouth frame 12 is removed from connected relation with the legs. Note particularly that the structural connection at the top of the tri-leg stand 11 is such that each leg 14 moves in a vertical plane 30a–30c generally radially oriented relative to the center axis 25 of the erected stand due to the transverse attitude of the legs' pivot axes 29 with the respective radial planes 30. The hook 20 is hung on one of the bolts 28, the hook being configured to hang down beneath the top 20 of the tri-leg stand 11.

Each of the legs 14 includes a telescoping tubular bottom section 32 having a single transverse bore 33 therethrough at the upper end, see FIGS. 1 and 4. This telescoping bottom section 32 cooperates with a lower portion of a top leg section 34, that lower portion being provided with three spaced transverse bores 35a–35c therethrough. A bolt 36 and wing nut 37 connect each leg's bottom section 32 with each leg's top section 34, the transverse bore 35a–35c on the top section used being dependent on the height desired of the bag mouth frame 12 above ground level 16. This leg 14 height adjustment means, therefore, is one of the vertical adjustment means which allows the bag mouth frame's vertical position above ground level 16 to be varied, as desired by the user, so as to insure that the garbage bag 15 connected to that bag mouth frame rests on ground 16 when it is connected to the bag support frame 12.

The bag mouth frame 12 is shown particularly in FIGS. 1, 3 and 3a. The bag mouth frame 12 is comprised of three rods 13a–13c connected to the stand's three legs 14a–14c. Each of the bag mouth frame's three rods 13 is provided with a single through bore 31 at the one end, and multiple (three as shown) through bores 38a–38c at the other end. When oriented in connected relation with the three legs 14 of the stand 11, the single through bore 31 end of one bag frame rod 13a is associated with the multi-throughbore 38 end of an adjacent bag frame rod 13c, see FIGS. 3 and 3a. The bag frame rods 13 are connected with the stand's legs by a bolt 39 and wing nut 40 connector structure. The mouth 18 size, i.e., the periphery, of the bag mouth frame 12 and, therefore, the horizontal cross sectional area defined by the bag mouth frame, is varied by connecting the multi-bored 38 end of one or more rods 13 through use of the inner bore 38c or the outer bore 38a or the in-between bore 38b with the associated leg 14. In this connection, compare FIG. 3 where the outer bores 38a on rods 13 are connected to the legs 14 with FIG. 3a where the inbetween bores 38b are used. In this connection, and at a given height L above ground 16, the pivot axis 29 connections of the three legs 14 (which permits motion in radial planes 30), cooperate with the mouth frame rods 13 to allow positioning of the legs as required to accommodate re-sizing of the mouth 18 size of the bag mouth frame 12. When the bag support frame 10 is to be collapsed for storage purposes, each cross rod 13 of the bag mouth frame 12 is disconnected at one end thereof from its associated legs 14.

The bag mouth frame 12 is also movable vertically relative to ground 16, as well as relative to the hook 20, by interconnecting the bag mouth frame 12 at the desired vertical location on the legs 14. In this connection, note each leg 14 is provided with multiple (five are shown) connector through bores 42a–42e along the length of each. The vertical positioning of bag mouth frame's three rods 13 is provided with a single through bore 31 at the one end, and multiple (three as shown) through bores 38a–38c at the other end. When oriented in connected relation with the three legs 13 of the stand 11, the single through bore 37 end of one bag frame rod 13a is associated with the multi-throughbore 38 end of an adjacent bag frame rod 13c, see FIGS. 3 and 3a. The bag frame rods 13 are connected with the stand's legs by a bolt 39 and wing nut 40 connector structure. The mouth 18 size, i.e., the periphery, of the bag mouth frame 12 and, therefore, the horizontal cross sectional area defined by the bag mouth frame, is varied by connecting the multi-bored 38 end of one or more rods 13 through use of the inner bore 38c or the outer bore 38a or the in-between bore 38b with the associated leg 14. In this connection, compare FIG. 3 where the outer bores 38a on rods 13 are connected to the legs 14 with FIG. 3a where the inbetween bores 13b are used. In this connection, and at a given height L above ground 16, the pivot axis 29 connections of the three legs 14 (which permits motion in radial planes 30), cooperate with the mouth frame rods 13 to allow positioning of the legs as required to accommodate re-sizing of the mouth 18 size of the bag mouth frame 12. When the bag support frame 10 is to be collapsed for storage purposes, each cross rod 13 of the bag mouth frame 12 is disconnected at one end thereof from its associated legs 14.

The bag mouth frame 12 is also movable vertically relative to ground 16, as well as relative to the hook 20, by interconnecting the bag mouth frame 12 at the desired vertical location on the legs 13. In this connection, note each leg 13 is the bag mouth frame 12 is therefore adjustable relative to the hook 20, as well as relative to ground 16, depending on which of these connector bores is associated with the bolt 39 and wing nut 40 connectors. Vertical positioning of the frame 12 by using connector bores 42 is, of course, independent of the length of the legs 14 as established by the interconnection position of each leg's top 34 and bottom 32 section.

The bag 15 is retained in connected or opened relation with the bag mouth frame 12 by spaced spring clips 43 after the open end of the bag has been lipped over the bag mouth frame's cross rods.

Having described in detail the preferred embodiment of my invention, what I desire to claim and protect by Letters Patent is:

1. A bag support frame comprising
   a plurality of legs connected one to another at the top ends thereof, said legs being connected together one to another for permitting said bag support frame to be moved between use and storage positions,
   a bag mouth frame connected with said legs, said bag mouth frame being adapted to support an open mouth primary bag in connected relation therewith, and said bag mouth frame comprising a plurality of rods each of which is connected between adjacent legs of said stand,
   horizontal adjustment means connected with said bag mouth frame, said horizontal adjustment means permitting the mouth size of said bag frame to be varied as desired by the user depending on the mouth size of that primary bag being used with said bag support frame, and said horizontal adjustment means comprising connector means by which said rods can be connected at a plurality of locations to at least one of said legs for permitting the bag mouth frame's mouth size to be varied,
   first vertical adjustment means connected with said bag mouth frame, said first vertical adjustment means permitting the vertical position of said bag mouth frame relative to the top ends of said legs to be varied as desired by the user, said first vertical adjustment means comprising a plurality of connector locations spaced along the length of each leg with each of said connector locations cooperating with said bag mouth frame for connecting said bag mouth frame to said legs at a plurality of different positions relative to the top of said stand,
   a hook connected at the top of said stand for supporting a secondary bag to be emptied into said primary bag, said first vertical adjustment means permitting the position of said bag mouth frame to be varied relative to said hook depending on the length of said secondary bag to be hung from said hook, and
   second vertical adjustment means connected with said legs, said second vertical adjustment means permitting said bag mouth frame to be adjusted vertically relative to ground as desired by by user, said second vertical adjustment means being structured so that adjustment of said bag mouth frame relative to ground is independent of adjustment of said bag mouth frame relative to the top of said stand, and said second vertical adjustment means comprising two sections for each leg with one section being telescopable relative to the other and with said sections being retainable in at least two different length telescoped positions relative one to another.

2. A bag support frame as set forth in claim 1, said legs being connected together one to another so that each is pivotable in a generally vertical plane radially extending from the vertical center axis of said stand.

* * * * *